(12) United States Patent
Fields et al.

(10) Patent No.: US 12,406,042 B2
(45) Date of Patent: Sep. 2, 2025

(54) USER AUTHENTICATION IN DECENTRALIZED COMPUTING SYSTEM ENVIRONMENT

(71) Applicant: Capital One Services, LLC, McLean, VA (US)

(72) Inventors: John Fields, Henrico, VA (US); Bharath Bhushan Sreeravindra, Fremont, CA (US); Matthew Michael Burke, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 301 days.

(21) Appl. No.: 18/145,058

(22) Filed: Dec. 22, 2022

(65) Prior Publication Data

US 2024/0211564 A1    Jun. 27, 2024

(51) Int. Cl.
*G06F 21/32* (2013.01)
*G06V 40/30* (2022.01)

(52) U.S. Cl.
CPC .............. *G06F 21/32* (2013.01); *G06V 40/33* (2022.01)

(58) Field of Classification Search
CPC ................................ G06F 21/32; G06V 40/33
See application file for complete search history.

(56) References Cited

U.S. PATENT DOCUMENTS

| 2020/0117690 A1* | 4/2020 | Tran | G06F 16/90332 |
| 2023/0155812 A1* | 5/2023 | Bennison | H04L 9/0861 |
| | | | 713/171 |
| 2023/0334492 A1* | 10/2023 | Tai | G06Q 20/326 |

* cited by examiner

*Primary Examiner* — Kristie D Shingles
(74) *Attorney, Agent, or Firm* — Foley & Lardner LLP (57) ABSTRACT

In some aspects, a computing system may authenticate a user before blockchain functions may be performed and provide obstacles to prevent brute force attacks in decentralized computing systems or other distributed computing system environments. The computing system may use a smart contract to assist with authenticating a user. As authentication attempts fail, the computing system may increase a network usage cost associated with authentication. By doing so, the security of a computing system may be improved by making it cost-prohibitive for malicious actors to perform brute force attacks. Further, a computing system may use a variety of biometric information that may provide additional verification and security when authentication is performed.

20 Claims, 5 Drawing Sheets

USER AUTHENTICATION IN DECENTRALIZED COMPUTING SYSTEM ENVIRONMENT

BACKGROUND

Many blockchain or other distributed computing systems are built upon public-key cryptography, which is a cryptographic system that may use pairs of keys including public keys and private keys. Public keys may be publicly known and may be used to identify a user. Private keys may be kept secret and may be used for authenticating a user.

A private key may be used to grant a user authorization for performing blockchain functions in connection with a given address on the blockchain. A blockchain wallet may be used to store a private key. When a user desires to perform a blockchain operation, software may sign the blockchain operation with the private key (e.g., without disclosing it). The signature may indicate to the blockchain system that the user has the authority to perform a blockchain operation.

SUMMARY

Although many blockchain or other distributed computing systems use private keys to enforce security and ensure that only authorized users are able to perform blockchain functions, the use of a private key has significant drawbacks leading to insecurity. If a malicious user is able to obtain or guess a private key, the malicious user can use it to derive the associated public address that the key unlocks. The private key then allows the malicious user to perform any blockchain operation as if the malicious user were the corresponding address's rightful owner. Further, due to the decentralized nature of blockchain technology, existing systems fail to prevent a malicious user from guessing private keys over and over again. This enables malicious actors to perform a brute force attack or an exhaustive search, which uses trial-and-error to guess possible combinations until a private key for an address is found. This may be possible because existing systems provide no centralized authority to limit the number of attempts any user may make to guess a private key that may enable the user to obtain access to an address that the user does not rightfully own.

To address these issues, nonconventional methods and systems described herein may provide additional checks to authenticate a user before blockchain functions may be performed and provide obstacles to prevent brute force attacks in decentralized computing systems or other distributed computing system environments. Specifically, methods and systems described herein may use a smart contract (e.g., deployed on a blockchain) to assist with authenticating a user. As authentication attempts are failed, the computing system may increase (e.g., via the smart contract) a network usage cost associated with authentication. By doing so, the security of a computing system (e.g., a blockchain or other decentralized system) may be improved by making it cost-prohibitive for malicious actors to perform brute force attacks. Further, a computing system may use a variety of biometric information (e.g., handwriting) that may provide additional verification and security when authentication is performed.

In some aspects, a computing system may obtain user information comprising a handwriting sample and authentication information associated with a user. The computing system may receive, from a first user device, a request to authenticate the user, wherein the request is associated with a smart contract executed by the computing node, and wherein the request is associated with a network usage cost indicated by the smart contract. Based on the request and the user information, the computing system may generate a set of authentication input requests for authenticating the user, wherein a first authentication input request indicates an orientation that a first input should be written in relation to a second input corresponding to a second authentication input request. Based on the set of authentication input requests, the computing system may obtain an image including a first handwritten input to the first authentication input request. The computing system may determine, based on the image and via a first machine learning model, that a difference between handwriting of the first handwritten input and the handwriting sample satisfies a first threshold. The computing system may determine, based on the image and via a second machine learning model, that the first handwritten input is incorrect. In response to the difference satisfying the first threshold and the first handwritten input being incorrect, the computing system may cause, via the smart contract, an increase in the network usage cost for a future request to authenticate the user. The computing system may send, to the first user device, an indication that authentication failed.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
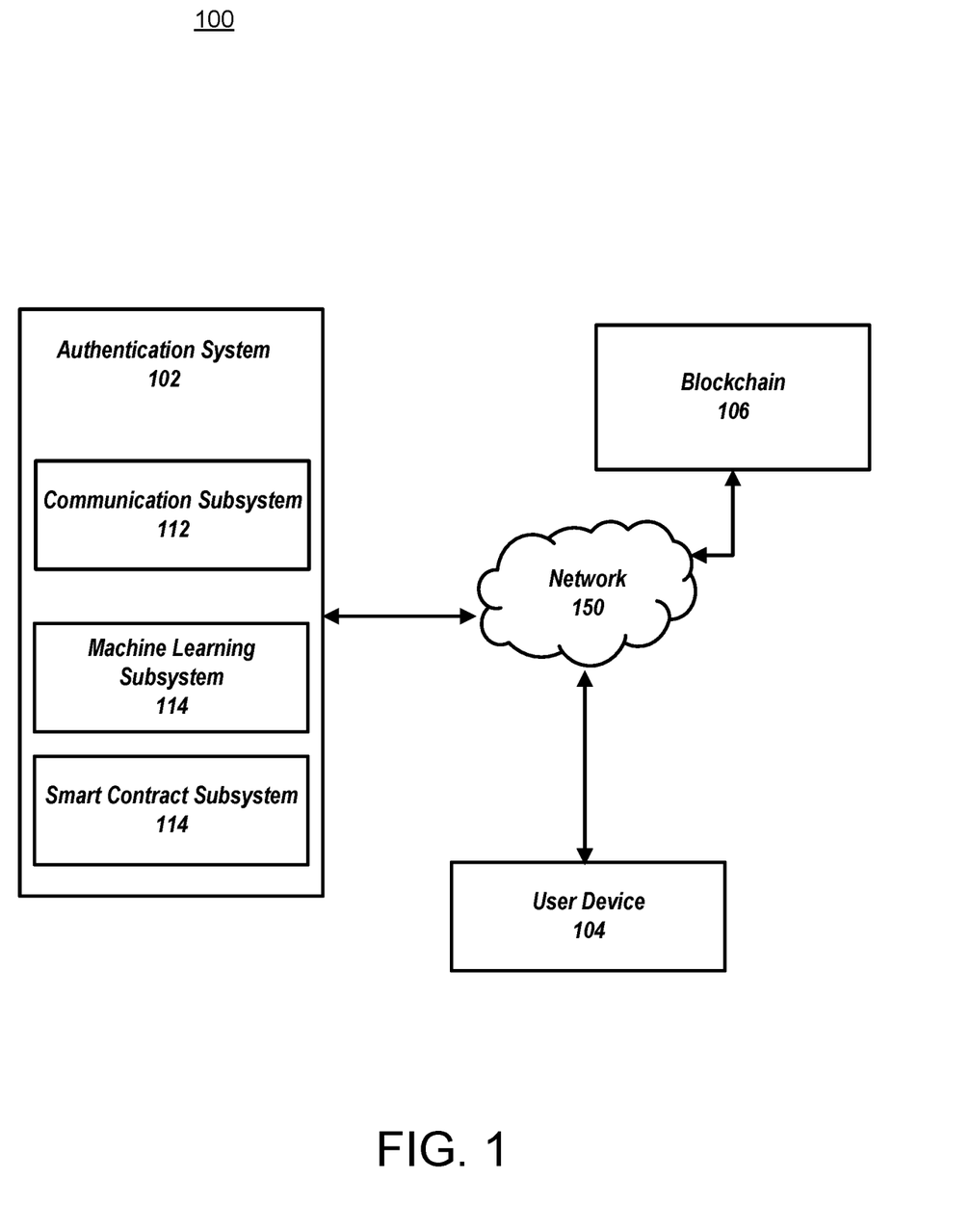
FIG. 1 shows an example system for authenticating a user, in accordance with one or more embodiments.

FIG. 1 shows an illustrative diagram for authenticating a user. The system 100 may include an authentication system 102, a blockchain 106, and a user device 104. any of which may communicate with each other or other devices via a network 150. The authentication system 102 may include a communication subsystem 112, a machine learning subsystem 114, or other components.

The authentication system 102 may obtain user information associated with a user. For example, the authentication system 102 may obtain user information that includes a handwriting sample and authentication information associated with the user. The handwriting sample may include an image of a portion of handwriting of the user (e.g., a sentence, a paragraph, etc.). The authentication information may include any information that may be used to authenticate the user. For example, the authentication information may include demographic information including an address, age, gender occupation, or a variety of other demographic information. The authentication information may include an identification (e.g., IP address, MAC address, cookie, etc.) of one or more devices that the user possesses.

In some embodiments, the authentication system 102 may be a computing node associated with a blockchain. For example, the authentication system 102 may be a computing node in the system 250 described below in connection with FIG. 2B. In some embodiments, the user information may be stored on the blockchain 106 (e.g., such as a blockchain described below in connection with FIG. 2B). The smart contract may be used to authenticate a user before the user can perform other actions in connection with the blockchain 106.

The authentication system 102 may obtain a request to authenticate a user. For example, the authentication system 102 may receive, from a first user device, a request to authenticate the user. The request may be associated with a smart contract executed by the computing node. For example, the smart contract may be stored on a blockchain 106 and may authenticate the user based on input from the user. By authenticating the user, the smart contract may enable the user to perform one or more actions. For example, the user may be able to perform one or more blockchain functions (e.g., any blockchain operation described below in connection with FIG. 2B) if authenticated via the smart contract. The smart contract may be associated with a network usage cost. For example, the smart contract may require a payment (e.g., with a cryptocurrency or other digital currency) to authenticate a user. In some embodiments, the user may be required to pay (e.g., via a user device) the network usage cost. In some embodiments, an organization (e.g., an organization associated with the smart contract, an organization associated with one or more blockchain functions that the authentication enables, etc.) may be required to pay the network usage cost. In some embodiments, the user and the organization may both be required to pay a portion of the network usage cost.

The authentication system 102 may obtain an authentication input request. An authentication input request may be a request for information that may help determine whether a user is the rightful user for performing one or more blockchain functions (e.g., the owner of an account, the rightful owner of a private key associated with the blockchain, etc.). The authentication input request may be a question (e.g., a challenge question) to which the user may provide an answer to be authenticated. The authentication system 102 may send the authentication input request to the user device from which a request to authenticate was sent (e.g., the user device 104). In some embodiments, based on the request and the user information, the authentication system 102 may generate a set of authentication input requests (e.g., questions) for authenticating the user. For example, an authentication input request may be a question to the user asking where the user went to high school. An authentication input request may be generated based on user information described above. For example, the authentication input request may ask the user to handwrite any of the demographic information described above.

The authentication input request may indicate one or more requirements associated with the input. The authentication input request may indicate a mode or medium in which the input should be provided. In one example, the authentication input request may be associated with a biometric of the user. For example, the authentication system 102 may request a fingerprint, facial, voice, iris, palm, or finger vein pattern from the user. The authentication system may adjust a network usage cost associated with authentication based on whether the biometric matches the rightful owner, for example, as described in connection with FIG. 2A below.

In one example, the authentication system 102 may require that an image with a handwritten answer to the authentication input request be submitted. The user may handwrite an answer using the user device 104 to send an image of the answer to the authentication system 102. Additionally or alternatively, the authentication system 102 may provide multiple authentication input requests (e.g., multiple questions) and may require a particular orientation of the answers in relation to each other. The authentication input requests may indicate an orientation or a position of a first input (e.g., a first handwritten answer) in relation to a second input. In one example, the authentication input requests may indicate that a first input should be written below a second input corresponding to a second authentication input request. In one example, the authentication input requests may indicate that a first input should be written upside down in relation to a second input. By doing so, the authentication system 102 may increase the security of the authentication system 102 because requesting particular orientations of authentication inputs may make it more difficult for malicious actors to use brute force attacks to obtain unauthorized access.

The authentication system 102 may obtain a response to one or more authentication input requests. For example, based on one or more authentication input requests, the authentication system 102 may obtain an image that includes a handwritten input associated with an authentication input request.

The authentication system 102 may determine, based on the response obtained at step 408, whether the user should be authenticated. For example, if the answers to questions are correct, and the handwriting is determined to match the handwriting of the rightful owner (e.g., based on a comparison with the handwriting sample), the authentication system may determine that the user is authenticated.

In some embodiments, the authentication system 102 may determine that the user should not be authenticated based on an identification of handwriting in the response. For example, the authentication system 102 may determine, based on the image and via a first machine learning model, that a difference between the handwriting of a handwritten input and a handwriting sample associated with a true user (e.g., the true owner of an account, a user that is not a malicious actor, etc.) satisfies a first threshold. Handwriting may be used as a biometric to identify a user. Due to the unique aspects of handwriting and each user having different handwriting, the authentication system 102 may be able to identify a user based on the user's handwriting. The authentication system 102 may use the handwriting to accurately identify a user and determine whether the user should be authenticated or not.

In one example, the authentication system 102 may generate a score indicative of how closely the handwriting in the input and the handwriting in the sample match. If the score satisfies a threshold score, the authentication system 102 may determine that the handwriting in the input and the sample do not match or are not written by the same user. Based on the handwriting not matching, the authentication system 102 may determine that the user should not be authenticated.

The authentication system 102 may determine that the user should not be authenticated based on one or more other aspects of the input. For example, the authentication system 102 may determine, based on the image and via a machine learning model, that the handwritten input does not include a correct answer to the authentication input request. The machine learning model may be trained to read handwriting and convert handwriting to other computer-readable text or characters. The authentication system 102 may compare the computer-readable text with the correct answer to the authentication input request to determine if the answer matches the correct answer. Based on the answer not matching the correct answer, the authentication system 102 may determine that the user should not be authenticated.

As an additional example, the input may not match an orientation or position that was indicated by one or more authentication input requests. For example, the authentication system 102 may determine (e.g., via one or more machine learning models) that a first answer to a first question is not placed below a second answer to a second question.

In some embodiments, the authentication system 102 may use a second device that is known to belong to a user that is to be authenticated. The authentication system 102 may send a secret to the second device and may determine whether the secret is reproduced in the response to the input request (e.g., the response obtained in step 408). For example, the authentication system 102 may send the secret to a second user device associated with the user. Based on sending the secret to the second user device, the authentication system 102 may determine whether the first input comprises the secret.

The authentication system 102 may adjust a network usage cost for the current authentication or for future authentications associated with the user (e.g., authentications associated with the rightful owner). The authentication system 102 may cause an increase in a network usage cost for future requests to authenticate, for example, based on determining that the user should not be authenticated. For example, in response to a difference between the handwriting sample and the handwritten input satisfying a first threshold and based on the handwritten input being incorrect (e.g., not matching an answer to a question), the authentication system 102 may cause, via the smart contract, an increase in the network usage cost for a future request to authenticate the user. By increasing a network usage cost for authentication based on a failed authentication attempt, the authentication system 102 may make it cost-prohibitive for a malicious actor to attempt authentication many times. By doing so, the authentication system 102 may increase the security of the authentication system 102 and prevent the ability of malicious actors to perform brute force attacks.

Figure 2A:
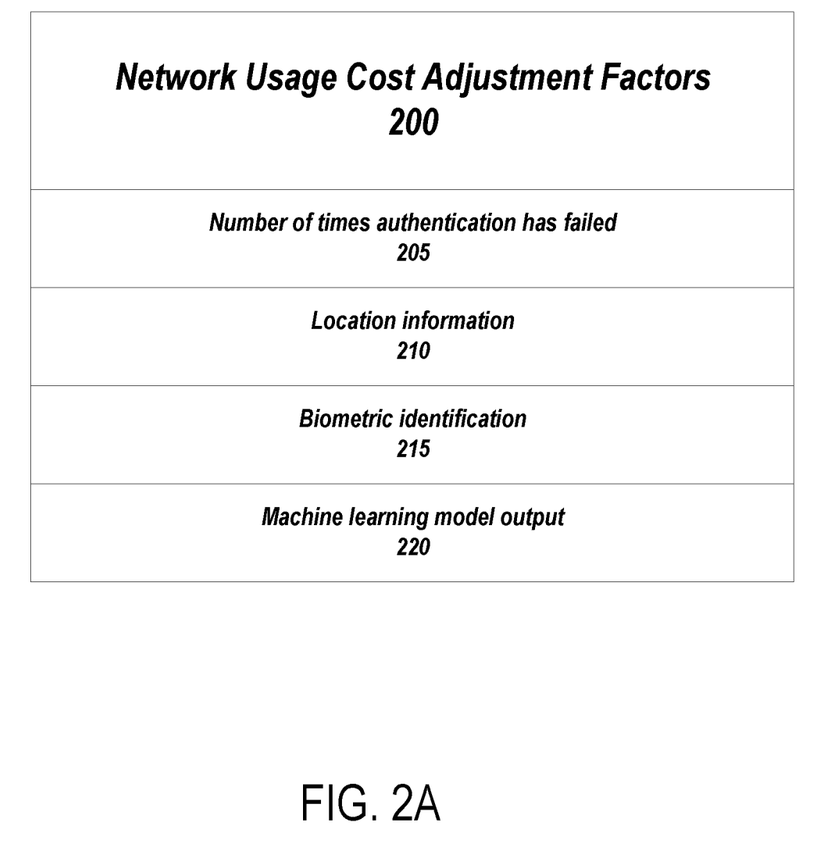
FIG. 2A shows example factors that may be used by a computing system to adjust network usage costs, in accordance with one or more embodiments.

Referring to FIG. 2A, example factors 200 for adjusting the network usage cost are shown. The authentication system 102 may use the factors 200 to determine whether the network usage cost of a current request or future request should be adjusted. Referring to factor 205, the authentication system 102 may increase the network usage cost for future requests based on the number of times authentication of the user has failed. For example, the authentication system 102 may determine a number of times that authentication of the user has failed. Based on the number of times that authentication of the user has failed being greater than a first threshold, the authentication system 102 may raise the network usage cost more than a second threshold amount.

Referring to factor 210, the authentication system may use location information associated with a user to determine whether the user should be authenticated. For example, based on receiving the request to authenticate, the authentication system 102 may obtain location information (e.g., GPS data, simultaneous localization and mapping data, etc.) associated with a first user device that sent the request to authenticate. Based on a location of the first user device being more than a threshold distance from a location of a second user device, the authentication system 102 (e.g., via the smart contract) may increase the network usage cost associated with the smart contract. The authentication system 102 may increase the network usage cost in this example because it may be more likely that an authentication attempt is from a malicious actor if the requesting device is not near a known device of the user. By increasing the network usage cost for authentication attempts that are deemed to be higher risk, the authentication system 102 may be more secure because malicious actors would need to pay a higher network usage cost, making it more difficult for them to perform brute force attacks because the cost of authentication is too high.

In one example, based on receiving the request to authenticate, the authentication system 102 may obtain location information associated with the user device that sent the authentication request. Based on the first user device being less than a threshold distance from a location of a second user device, the authentication system 102 may decrease the network usage cost associated with the smart contract. The user device that sent the authentication request or the second user device may be a mobile device, a laptop, or a variety of other devices described in connection with FIG. 3. By confirming that the requesting device is close to a second device that the true user (e.g., rightful owner of an address, etc.) is known to possess, the authentication system 102 may be able to use a smaller network usage cost because it is more likely that the true user is trying to authenticate. By doing so, the authentication system 102 may create a better user experience because the network usage cost is lower when the authentication system 102 is more confident that the authentication attempt is not from a malicious actor.

Referring to factor 215, the authentication system 102 may adjust the network usage cost based on biometric information received from the user device that sent the request to authenticate. For example, if biometric information matches a biometric sample associated with the rightful owner, the authentication system 102 may decrease the network usage cost (e.g., decrease the cost to lower than a threshold amount) for the current authentication request or future authentications. As an additional example, if biometric information does not match a biometric sample (e.g., the biometric information is determined to not sufficiently match one or more biometric samples) associated with the rightful owner, the authentication system 102 may increase the network usage cost (e.g., increase the cost to higher than a threshold amount) for the current authentication request or future authentications.

Referring to factor 220, the authentication system may adjust the network usage cost based on output generated via a machine learning model. For example, the authentication system 102 may use a machine learning model (e.g., a machine learning model described above in connection with FIG. 3) to determine a risk or probability that an authentication attempt is from a malicious actor. The authentication system 102 may adjust the network usage cost based on the risk or probability. For example, based on receiving the request to authenticate, the authentication system 102 may obtain a score generated via an anomaly detection model. The score may indicate whether the request is suspected to be associated with a malicious user. Based on the score satisfying a threshold score, the authentication system 102 may increase the network usage cost for authenticating the user (e.g., the network usage cost associated with the smart contract).

Figure 2B:
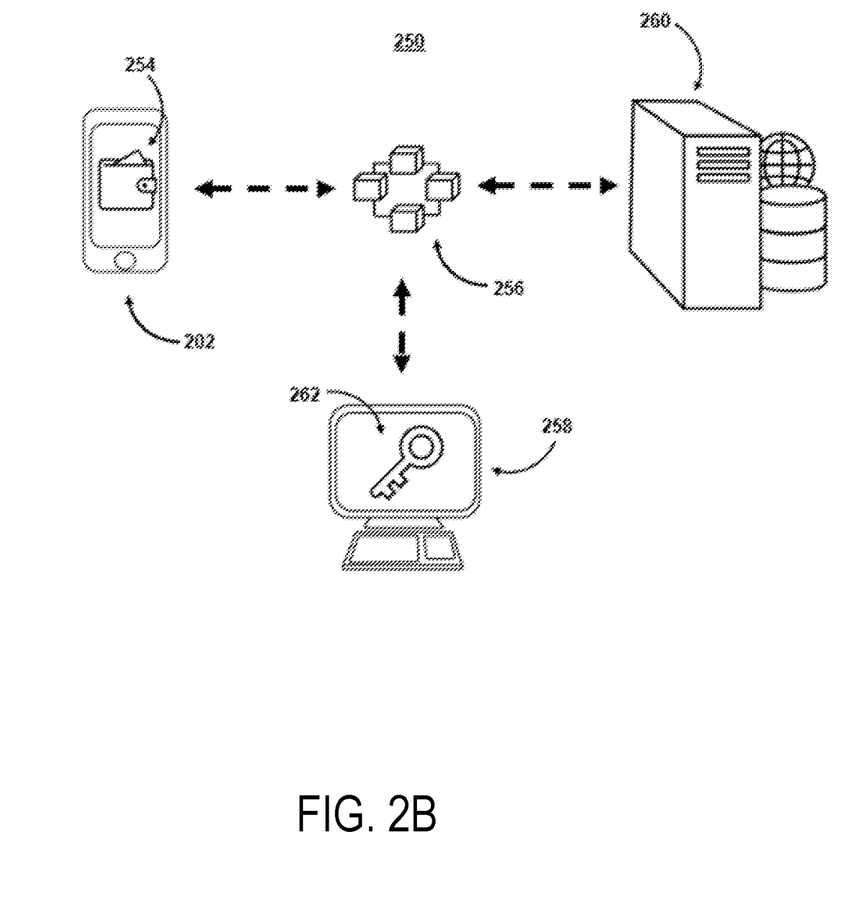
FIG. 2B shows an illustrative diagram for conducting blockchain functions, in accordance with one or more embodiments.

FIG. 2B shows an illustrative diagram for conducting blockchain functions, in accordance with one or more embodiments. The diagram presents various components that may be used to perform blockchain functions, for example, after a user has been authenticated as described above.

FIG. 2B includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to authenticate a user (e.g., as described above in connection with FIGS. 1-2A or FIG. 4), and the user interface may display content related to recognizing handwriting, determining whether handwriting matches a sample of handwriting, determining whether an authentication attempt is anomalous, or other actions such as those described in connection with FIGS. 1-2A or FIG. 4. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2B, system 250 may include multiple user devices (e.g., user device 202, user device 258, and/or user device 260). For example, system 250 may comprise a distributed state machine, in which each of the components in FIG. 2B acts as a client of system 250. For example, system 250 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2B, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 250 performing a blockchain operation may equally be applied to, and correspond to, an individual user device (e.g., user device 202, user device 258, and/or user device 260) performing the blockchain operation. That is, system 250 may correspond to the user devices (e.g., user device 202, user device 258, and/or user device 260) collectively or individually.

Each of the user devices may be used by the system to conduct blockchain functions and/or contribute to authenticating a user (e.g., as described in connection with FIGS. 1-2A or FIG. 4). As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2B, one or more user devices may include a digital wallet (e.g., digital wallet 254) used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 2B, one or more user devices may include a private key (e.g., key 262) and/or digital signature. For example, system 250 may use cryptographic systems for conducting blockchain functions such as authenticating a user (e.g., as described in connection with FIGS. 1-2A or FIG. 4). For example, system 250 may use public-key cryptography, which features a pair of digital keys (e.g., which may comprise strings of data). In such cases, each pair comprises a public key (e.g., which may be public) and a private key (e.g., which may be kept private). System 250 may generate the key pairs using cryptographic algorithms (e.g., featuring one-way functions). System 250 may then encrypt a message (or other blockchain operation) using an intended receiver's public key such that the encrypted message may be decrypted only with the receiver's corresponding private key. In some embodiments, system 250 may combine a message with a private key to create a digital signature on the message. For example, the digital signature may be used to verify the authenticity of blockchain functions. As an illustration, when conducting blockchain functions, system 250 may use the digital signature to prove to every node in the system that it is authorized to conduct the blockchain functions.

For example, system 250 may comprise a plurality of nodes for the blockchain network. Each node may correspond to a user device (e.g., user device 258). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 258 may request a blockchain operation (e.g., conduct a transaction). The blockchain operation may be authenticated by user device 258 and/or another node (e.g., a user device in the community network of system 250). For example, using cryptographic keys, system 250 may identify users and give access to their respective user accounts (e.g., corresponding digital wallets) within system 250. Using private keys (e.g., known only to the respective users) and public keys (e.g., known to the community network), system 250 may create digital signatures to authenticate the users.

Following an authentication of the blockchain operation (e.g., using key 262), the blockchain operation may be authorized. For example, after the blockchain operation is authenticated between the users, system 250 may authorize the blockchain operation prior to adding it to the blockchain. System 250 may add the blockchain operation to blockchain 256. System 250 may perform this based on a consensus of the user devices within system 250. For example, system 250 may rely on a majority (or other metric) of the nodes in the community network (e.g., user device 202, user device 258, and/or user device 260) to determine that the blockchain operation is valid. In response to validation of the block, a node user device (e.g., user device 202, user device 258, and/or user device 260) in the community network (e.g., a miner) may receive a reward (e.g., in a given cryptocurrency) as an incentive for validating the block.

To validate the blockchain operation, system 250 may use one or more validation protocols and/or validation mechanisms. For example, system 250 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 250 may use a proof-of-stake mechanism in which a user account (e.g., corresponding to a node on the blockchain network) is required to have, or "stake," a predetermined amount of tokens in order for system 250 to recognize it as a validator in the blockchain network.

In response to validation of the block, the block is added to blockchain 256, and the blockchain operation is completed. For example, to add the blockchain operation to blockchain 256, the successful node (e.g., the successful miner) encapsulates the blockchain operation in a new block before transmitting the block throughout system 250.

Figure 3:
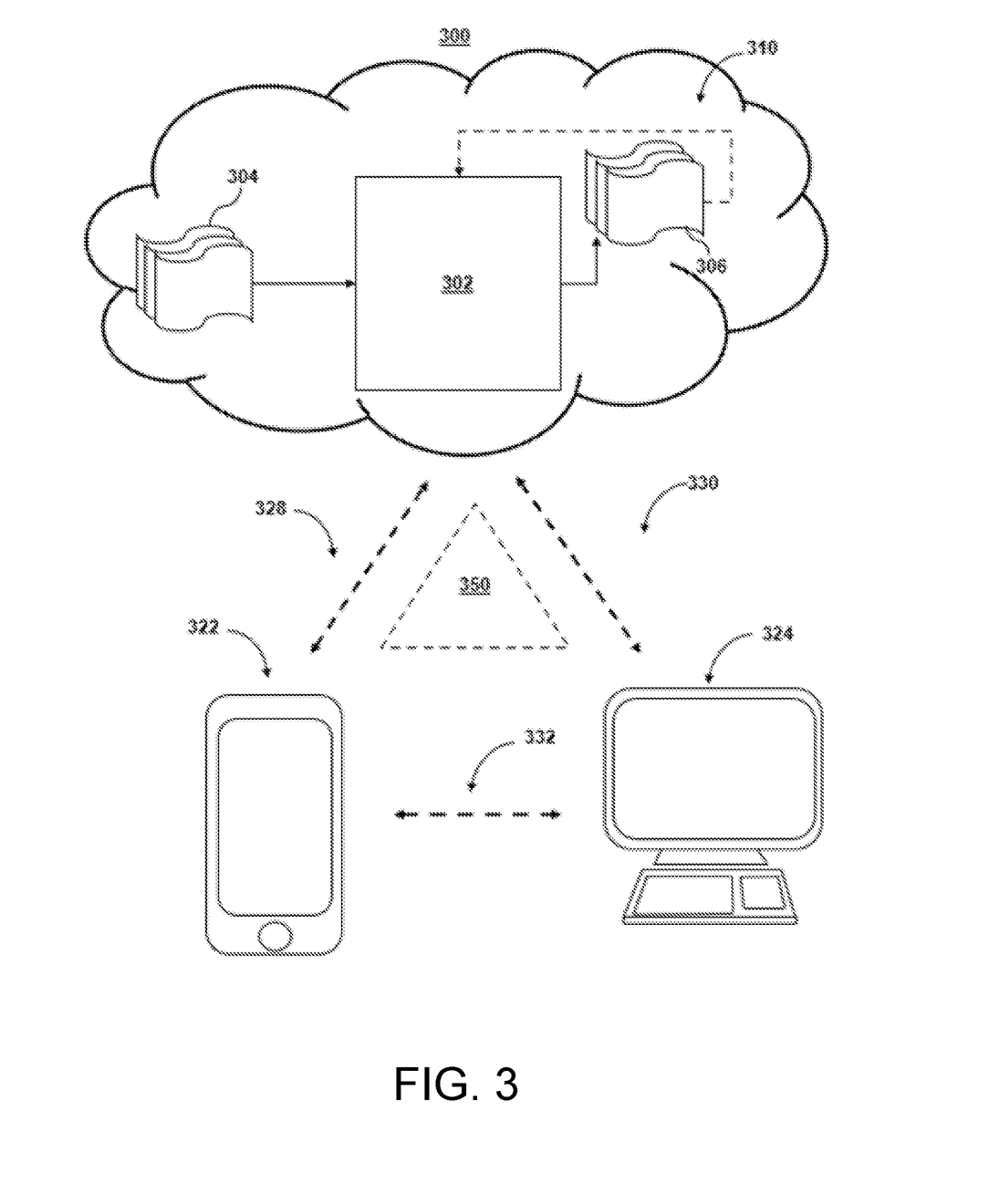
FIG. 3 shows illustrative components for a system that may adjust network usage costs used to authenticate a user, in accordance with one or more embodiments.

FIG. 3 shows illustrative components for a system 300 that may be used to determine whether a user should be authenticated as described herein (e.g., recognizing handwriting, determining whether handwriting matches a sample of handwriting, determining whether an authentication attempt is anomalous, or performing other actions such as those described in connection with FIGS. 1-2 and FIG. 4.), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2, and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., authentication data, network usage cost increase data, handwriting recognition or identification data, etc.).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to determine whether a user should be authenticated as described herein (e.g., recognizing handwriting, determining whether handwriting matches a sample of handwriting, determining whether an authentication attempt is anomalous, or performing other actions such as those described in connection with FIGS. 1-2 and FIG. 4).

Each of these devices may also include electronic storages. The electronic storages may include non-transitory storage media that electronically stores information. The electronic storage media of the electronic storages may include one or both of (i) a system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the authentication system 102, the blockchain 106, or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may determine whether a user should be authenticated as described herein (e.g., by recognizing handwriting, determining whether handwriting matches a sample of handwriting, determining whether an authentication attempt is anomalous, or performing other actions such as those described in connection with FIGS. 1-2 and FIG. 4).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may perform actions related to determining whether a user should be authenticated as described herein (e.g., recognizing handwriting, determining whether handwriting matches a sample of handwriting, determining whether an authentication attempt is anomalous, or performing other actions such as those described in connection with FIGS. 1-2 and FIG. 4).

System 300 also includes application programming interface (API) layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols, such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
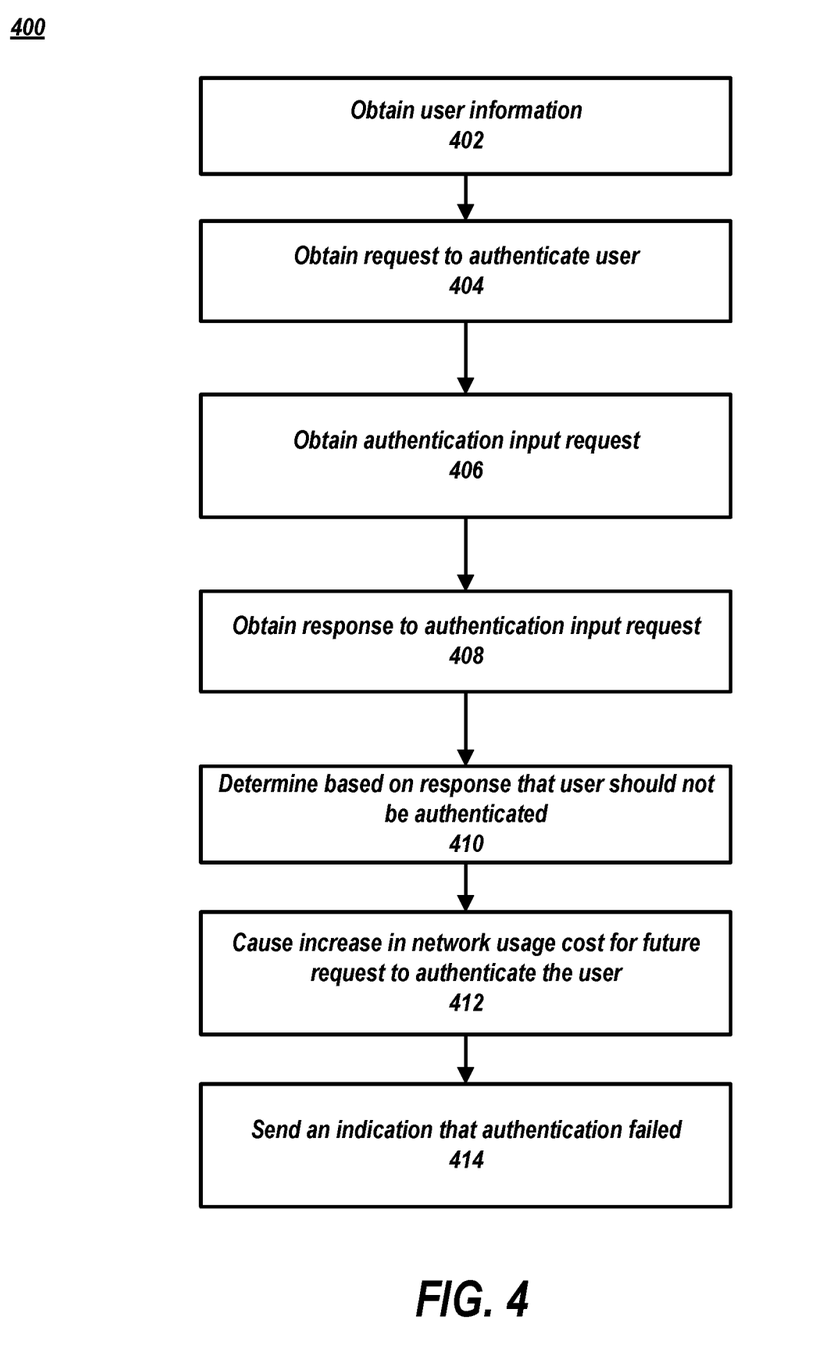
FIG. 4 shows an example flowchart with steps for adjusting network usage costs, in accordance with one or more embodiments.

FIG. 4 shows a flowchart of the steps involved in generating content-defined trees to store data objects, in accordance with one or more embodiments. Although described as being performed by a computing system, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, a computing system may obtain user information associated with a user. For example, the computing system may obtain user information that includes a handwriting sample and authentication information associated with the user. The authentication information may include information that may be used to authenticate the user. For example, the authentication information may include demographic information including an address, age, gender occupation, or a variety of other demographic information. The authentication information may include an identification (e.g., IP address, MAC address, cookie, etc.) of one or more devices that the user possesses.

At step 404, the computing system may obtain a request to authenticate the user for whom user information was obtained at step 402. For example, the computing system may receive from a first user device, a request to authenticate the user. The request may be associated with a smart contract executed by the computing node. For example, the smart contract may be stored on a blockchain and may authenticate the user based on input from the user. By authenticating the user, the smart contract may enable the user to perform one or more actions. For example, the user may be able to perform one or more blockchain functions (e.g., as described above in connection with FIG. 2B) if authenticated via the smart contract. The smart contract may be associated with a network usage cost. For example, the smart contract may require a payment (e.g., with a cryptocurrency or other digital currency) to authenticate a user. In some embodiments, the user may be required to pay (e.g., via a user device) the network usage cost. In some embodiments, an organization (e.g., an organization associated with the smart contract, an organization associated with one or more blockchain functions that the authentication enables, etc.) may be required to pay the network usage cost. In some embodiments, the user and the organization may both be required to pay a portion of the network usage cost.

At step 406, the computing system may obtain an authentication input request. The authentication input request may be a challenge question to which the user may provide an answer to be authenticated. The computing system may send the authentication input request to the user device from which a request to authenticate was sent (e.g., the user device described in connection with step 404 above). In some embodiments, based on the request and the user information, the computing system may generate a set of authentication input requests (e.g., questions) for authenticating the user. For example, an authentication input request may be a question to the user asking where the user went to high school. An authentication input request may be generated based on user information obtained at step 404. For example, the authentication input request may ask the user to handwrite any of the demographic information described above.

The authentication input request may indicate one or more requirements associated with the input. The authentication input request may indicate a mode or medium in which the input should be provided. In one example, the computing system may require that an image with a handwritten answer to the authentication input request be submitted. The user may handwrite an answer using a user device to send an image of the answer to the computing system. Additionally or alternatively, the computing system may provide multiple authentication input requests (e.g., multiple questions) and may require a particular orientation of the answers in relation to each other. The authentication input requests may indicate an orientation or a position of a first input (e.g., a first handwritten answer) in relation to a second input. In one example, the authentication input requests may indicate that a first input should be written below a second input corresponding to a second authentication input request. In one example, the authentication input requests may indicate that a first input should be written upside down in relation to a second input. By doing so, the computing system may increase the security of the computing system because requesting particular orientations of authentication inputs may make it more difficult for malicious actors to use brute force attacks to obtain unauthorized access.

At step 408, the computing system may obtain a response to one or more authentication input requests (e.g., the authentication input requests described in connection with step 406 above). For example, based on one or more authentication input requests, the computing system may obtain an image that includes a handwritten input associated with an authentication input request.

At step 410, the computing system may determine, based on the response obtained at step 408, that the user should not be authenticated. The computing system may determine that the user should not be authenticated based on an identification of handwriting in the response. For example, the computing system may determine, based on the image and via a first machine learning model, that a difference between handwriting of a handwritten input and a handwriting sample associated with a true user (e.g., the true owner of an account, a user that is not a malicious actor, etc.) satisfies a first threshold. In one example, the computing system may generate a score indicative of how closely the handwriting in the input and the handwriting in the sample match. If the score satisfies a threshold score, the computing system may determine that the handwriting in the input and the sample do not match or are not written by the same user. Based on the handwriting not matching, the computing system may determine that the user should not be authenticated.

The computing system may determine that the user should not be authenticated based on one or more other aspects of the input. For example, the computing system may determine, based on the image and via a machine learning model, that the handwritten input does not include a correct answer to the authentication input request (e.g., the authentication input request from step 406). The machine learning model may be trained to read handwriting and convert handwriting to other computer-readable text. The computing system may compare the computer-readable text with the correct answer to the authentication input request to determine if the answer matches the correct answer. Based on the answer not matching the correct answer, the computing system may determine that the user should not be authenticated.

As an additional example, the input may not match an orientation or position that was indicated by one or more authentication input requests. For example, the computing system may determine (e.g., via one or more machine learning models) that a first answer to a first question is not placed below a second answer to a second question.

In some embodiments, the computing system may use a second device that is known to belong to a user that is to be authenticated. The computing system may send a secret to the second device and may determine whether the secret is reproduced in the response to the input request (e.g., the response obtained in step 408). For example, the computing system may send the secret to a second user device associated with the user. Based on sending the secret to the second user device, the computing system may determine whether the first input comprises the secret.

At step 412, the computing system may cause an increase in a network usage cost for future requests to authenticate. The computing system may cause an increase in a network usage cost for future requests to authenticate, for example, based on determining that the user should not be authenticated (e.g., as described above in connection with step 410). For example, in response to a difference between the handwriting sample and the handwritten input satisfying a first threshold and based on the handwritten input being incorrect (e.g., not matching an answer to a question), the computing system may cause, via the smart contract, an increase in the network usage cost for a future request to authenticate the user. By increasing a network usage cost for authentication based on a failed authentication attempt, the computing system may make it cost-prohibitive for a malicious actor to attempt authentication many times. By doing so, the computing system may increase the security of the computing system and prevent the ability of malicious actors to perform brute force attacks.

In some embodiments, the computing system may increase the network usage cost for future requests based on the number of times authentication of the user has failed. For example, the computing system may determine a number of times that authentication of the user has failed. Based on the number of times that authentication of the user has failed being greater than a first threshold, the computing system may raise the network usage cost more than a second threshold amount.

Additionally or alternatively, the computing system may adjust or determine a current network usage cost (e.g., the network usage cost associated with the authentication request obtained at step 404). The computing system may determine a network usage cost based on a variety of factors associated with the authentication request or the input obtained (e.g., the response to the authentication input request obtained in step 406). In one example, based on receiving the request to authenticate, the computing system may obtain location information associated with the first user device. Based on a location of the first user device being more than a threshold distance from a location of a second user device, the computing system (e.g., via the smart contract) may increase the network usage cost associated with the smart contract. The computing system may increase the network usage cost in this example because it may be more likely that an authentication attempt is from a malicious actor if the requesting device is not near a known device of the user. By increasing the network usage cost for authentication attempts that are deemed to be higher risk, the computing system may be more secure because malicious actors would need to pay a higher network usage cost, which would make it more difficult for them to perform brute force attacks because the cost of authentication would be too high.

In one example, based on receiving the request to authenticate, the computing system may obtain location information associated with the user device that sent the authentication request. Based on the first user device being less than a threshold distance from a location of a second user device, the computing system may decrease the network usage cost associated with the smart contract. By confirming that the requesting device is close to a second device that the true user is known to possess, the computing system may be able to use a smaller network usage cost because it is more likely that the true user is trying to authenticate. By doing so, the computing system may create a better user experience because the network usage cost would be lower when the computing system is more confident that the authentication attempt is not from a malicious actor.

In some embodiments, the computing system may use a machine learning model (e.g., a machine learning model described above in connection with FIG. 3) to determine a risk or probability that an authentication attempt is from a malicious actor. The computing system may adjust the network usage cost based on the risk or probability. For example, based on receiving the request to authenticate, the computing system may obtain a score generated via an anomaly detection model. The score may indicate whether the request is suspected to be associated with a malicious user. Based on the score satisfying a threshold score, the computing system may increase the network usage cost for authenticating the user (e.g., the network usage cost associated with the smart contract).

At step 414, the computing system may send an indication that authentication failed. For example, the computing system may send the indication that authentication failed to the user device that sent the request to authenticate (e.g., in step 404).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or to increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: obtaining, via a computing node of a distributed system, user information comprising an input sample and authentication information associated with a user; receiving, from a first user device, a request to authenticate the user, wherein the request is associated with a smart contract executed by the computing node, and wherein the request is associated with a network usage cost indicated by the smart contract; based on the request and the user information, generating a first authentication input request for authenticating the user; obtaining, via the first user device, a first input to the first authentication input request; determining that the first input is incorrect; in response to the first input being incorrect, causing, via the smart contract, an increase in the network usage cost for a future request to authenticate the user; and sending, to the first user device, an indication that authentication failed.

2. The method of any of the preceding embodiments, wherein the first authentication input request indicates an orientation that a first input should be written in relation to a second input, the second input corresponding to a second authentication input request.

3. The method of any of the preceding embodiments, wherein obtaining an input to the first authentication input request comprises: obtaining an image comprising a first handwritten input to the first authentication input request and a second handwritten input to a second authentication input request.

4. The method of any of the preceding embodiments, wherein determining that the first input is incorrect comprises:
determining, based on the image and via a first machine learning model, that a difference between handwriting of the first handwritten input and a handwriting sample satisfies a first threshold; and determining, based on the image and via a second machine learning model, that the first handwritten input is incorrect.

5. The method of any of the preceding embodiments, further comprising: based on receiving the request to authenticate, obtaining location information associated with the first user device; and based on a location of the first user device being more than a threshold distance from a location of a second user device, increasing the network usage cost associated with the smart contract.

6. The method of any of the preceding embodiments, further comprising: based on receiving the request to authenticate, obtaining location information associated with the first user device; and based on the first user device being less than a threshold distance from a location of a second user device, decreasing the network usage cost associated with the smart contract.

7. The method of any of the preceding embodiments, further comprising: based on receiving the request to authenticate, obtaining a score generated via an anomaly detection model, wherein the score indicates whether the request is suspected to be associated with a malicious user; and based on the score satisfying a threshold score, increasing the network usage cost associated with the smart contract.

8. The method of any of the preceding embodiments, wherein causing, via the smart contract, an increase in the network usage cost for a future request to authenticate the user comprises: determining a number of times that authentication of the user has failed; and based on the number of times being greater than a first threshold, raising the network usage cost more than a second threshold amount.

9. The method of any of the preceding embodiments, wherein the first authentication input request corresponds to reproducing a secret, the method further comprising: sending the secret to a second user device associated with the user; and based on sending the secret to the second user device, determining whether the first input comprises the secret.

10. A tangible, non-transitory, machine-readable medium storing instructions that, when executed by a data processing apparatus, cause the data processing apparatus to perform operations comprising those of any of embodiments 1-9.

11. A system comprising one or more processors; and memory storing instructions that, when executed by the processors, cause the processors to effectuate operations comprising those of any of embodiments 1-9.

12. A system comprising means for performing any of embodiments 1-9.

What is claimed is:

1. A computing node of a distributed system for facilitating user authentication by using biometric information, smart contracts, and network usage costs to prevent brute force attacks, the computing node comprising:
one or more processors and media having instructions recorded thereon that, when executed by the one or more processors, cause operations comprising:
obtaining user information comprising an input sample and authentication information associated with a user;
receiving, from a first user device, a request to authenticate the user, wherein the request is associated with a smart contract executed by the computing node, and wherein the request is associated with a network usage cost indicated by the smart contract;
based on the request and the user information, generating a first authentication input request for authenticating the user;
obtaining, via the first user device, a first input to the first authentication input request;
in response to (i) the first input being incorrect and (i) a number of times, that authentication of the user has fail, being greater than a first threshold amount, causing, via the smart contract, an increase in the network usage cost for a future request to authenticate the user by raising the network usage cost at least a second threshold amount; and
sending, to the first user device, an indication that authentication failed.

2. The computing node of claim 1, wherein the instructions, when executed by the one or more processors, cause operations further comprising:
based on receiving the request to authenticate, obtaining location information associated with the first user device; and
based on the location information indicating a location of the first user device being more than a threshold distance from a location of a second user device, increasing the network usage cost associated with the smart contract.

3. The computing node of claim 1, wherein the first authentication input request corresponds to reproducing a secret, wherein the instructions, when executed, cause operations further comprising:
sending the secret to a second user device associated with the user; and
based on sending the secret to the second user device, determining whether a first handwritten input has reproduced the secret.

4. The computing node of claim 1, wherein the instructions, when executed by the one or more processors, cause operations further comprising:
based on a location of the first user device being more than a threshold distance from a location of a second user device, increasing the network usage cost associated with the smart contract.

5. The computing node of claim 1, wherein the instructions, when executed by the one or more processors, cause operations further comprising:
based on receiving the request to authenticate, obtaining a score generated via an anomaly detection model, wherein the score indicates whether the request is suspected to be associated with a malicious user; and
based on the score satisfying a threshold score, increasing the network usage cost associated with the smart contract.

6. A method for facilitating user authentication by using smart contracts and network usage costs to prevent brute force attacks by malicious actors, the method comprising:
obtaining, via a computing node of a distributed system, user information comprising an input sample and authentication information associated with a user;
receiving, from a first user device, a request to authenticate the user, wherein the request is associated with a smart contract executed by the computing node, and wherein the request is associated with a network usage cost indicated by the smart contract;
based on receiving the request to authenticate, obtaining a score generated via an anomaly detection model, wherein the score indicates whether the request is suspected to be associated with a malicious user;
based on the request and the user information, generating a first authentication input request for authenticating the user;
obtaining, via the first user device, a first input to the first authentication input request;
determining that the first input is incorrect;
in response to (i) the first input being incorrect and (ii) the score satisfying a threshold score, causing, via the smart contract, an increase in the network usage cost for a future request to authenticate the user; and
sending, to the first user device, an indication that authentication failed.

7. The method of claim 6, wherein the first authentication input request indicates an orientation that a first input should be written in relation to a second input, the second input corresponding to a second authentication input request.

8. The method of claim 6, wherein obtaining an input to the first authentication input request comprises:
obtaining an image comprising a first handwritten input to the first authentication input request and a second handwritten input to a second authentication input request.

9. The method of claim 8, wherein determining that the first input is incorrect comprises:
determining, based on the image and via a first machine learning model, that a difference between handwriting of the first handwritten input and a handwriting sample satisfies a first threshold; and
determining, based on the image and via a second machine learning model, that the first handwritten input is incorrect.

10. The method of claim 6, further comprising:
based on a location of the first user device being more than a threshold distance from a location of a second user device, increasing the network usage cost associated with the smart contract.

11. The method of claim 6, further comprising:
based on a location of the first user device being less than a threshold distance from a location of a second user device, decreasing the network usage cost associated with the smart contract.

12. The method of claim 6, wherein causing, via the smart contract, an increase in the network usage cost for a future request to authenticate the user comprises:
determining a number of times that authentication of the user has failed; and
based on the number of times being greater than a first threshold, raising the network usage cost more than a second threshold amount.

13. The method of claim 6, wherein the first authentication input request corresponds to reproducing a secret, the method further comprising:
sending the secret to a second user device associated with the user; and
based on sending the secret to the second user device, determining whether the first input comprises the secret.

14. One or more non-transitory computer-readable media comprising instructions that, when executed by one or more processors, cause operations comprising:
obtaining, via a computing node of a distributed system, user information comprising an input sample and authentication information associated with a user;
receiving, from a first user device, a request to authenticate the user, wherein the request is associated with a smart contract executed by the computing node, and wherein the request is associated with a network usage cost indicated by the smart contract;
based on the request and the user information, generating a first authentication input request for authenticating the user;
obtaining, via the first user device, a first input to the first authentication input request;
determining that the first input is incorrect;
in response to the first input being incorrect, and based on a distance of a location of the first user device from a location of a second user device, causing, via the smart contract, an increase in the network usage cost for a future request to authenticate the user; and
sending, to the first user device, an indication that authentication failed.

15. The one or more non-transitory computer-readable media of claim 14, wherein the first authentication input request indicates an orientation that the first input should be written in relation to a second input, the second input corresponding to a second authentication input request.

16. The one or more non-transitory computer-readable medium media of claim 14, wherein obtaining an input to the first authentication input request comprises:
obtaining an image comprising a first handwritten input to the first authentication input request and a second handwritten input to a second authentication input request.

17. The one or more non-transitory computer-readable media of claim 16, wherein determining that the first input is incorrect comprises:
determining, based on the image and via a first machine learning model, that a difference between handwriting of the first handwritten input and a handwriting sample satisfies a first threshold; and
determining, based on the image and via a second machine learning model, that the first handwritten input is incorrect.

18. The one or more non-transitory computer-readable media of claim 14, wherein the instructions, when executed, cause operations further comprising:
based on a location of the first user device being more than a threshold distance from a location of the second user device, increasing the network usage cost associated with the smart contract.

19. The one or more non-transitory computer-readable media of claim 14, wherein the instructions, when executed, cause operations further comprising:
based on a location of the first user device being less than a threshold distance from a location of the second user device, decreasing the network usage cost associated with the smart contract.

20. The one or more non-transitory computer-readable media of claim 14, wherein the instructions, when executed, cause operations further comprising:
based on receiving the request to authenticate, obtaining a score generated via an anomaly detection model, wherein the score indicates whether the request is suspected to be associated with a malicious user; and
based on the score satisfying a threshold score, increasing the network usage cost associated with the smart contract.

* * * * *